(12) United States Patent
Dan et al.

(10) Patent No.: US 11,652,352 B2
(45) Date of Patent: May 16, 2023

(54) CHARGE AND DISCHARGE CIRCUIT

(71) Applicant: Contemporary Amperex Technology Co., Limited, Fujian (CN)

(72) Inventors: Zhimin Dan, Fujian (CN); Jinbo Cai, Fujian (CN); Wei Zhang, Fujian (CN); Yizhen Hou, Fujian (CN); Xiong Zheng, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 140 days.

(21) Appl. No.: 16/978,683

(22) PCT Filed: Dec. 6, 2019

(86) PCT No.: PCT/CN2019/123707
§ 371 (c)(1),
(2) Date: Sep. 5, 2020

(87) PCT Pub. No.: WO2020/114497
PCT Pub. Date: Nov. 6, 2020

(65) Prior Publication Data
US 2020/0403418 A1 Dec. 24, 2020

(30) Foreign Application Priority Data
Dec. 7, 2018 (CN) .......................... 201811493731.9

(51) Int. Cl.
*H02J 7/00* (2006.01)
*H02J 7/14* (2006.01)
(52) U.S. Cl.
CPC .................................. *H02J 7/0013* (2013.01)

(58) Field of Classification Search
CPC ................. H02J 7/0013; H02J 7/00302; H02J 7/003065; H02J 7/0031; H02J 7/0068
See application file for complete search history.

(56) References Cited

U.S. PATENT DOCUMENTS 5,789,900 A   8/1998  Hasegawa et al.
6,118,254 A   9/2000  Faulk
(Continued)

FOREIGN PATENT DOCUMENTS

CN    102656767 A    9/2012
CN    103847531 A    6/2014
(Continued)

OTHER PUBLICATIONS

The extended European search report for European Application No. 19893957.1, dated Apr. 1, 2021, 10 pages.
(Continued)

*Primary Examiner* — Alexis B Pacheco
(74) *Attorney, Agent, or Firm* — East IP P.C.

(57) ABSTRACT

The present application provides a charge and discharge circuit, and relates to the field of battery power. The charge and discharge circuit comprises: a charge circuit comprising a battery pack, a first switch set and a charging device connected in series; and a discharge circuit comprising the battery pack, a second switch set and an electrical device connected in series; both the first switch set and the second switch set comprise at least one switch, and the at least one switch in the first and/or second switch set is a semiconductor switch.

3 Claims, 4 Drawing Sheets

(56) References Cited

U.S. PATENT DOCUMENTS

| | | | |
|---|---|---|---|
| 2004/0041542 A1* | 3/2004 | Phillips | H01M 10/44 320/160 |
| 2007/0075684 A1 | 4/2007 | Liu et al. | |
| 2007/0188140 A1 | 8/2007 | Chen | |
| 2007/0210751 A1* | 9/2007 | Wang | H02J 7/0013 320/116 |
| 2010/0052615 A1* | 3/2010 | Loncarevic | H02J 7/0016 320/118 |
| 2010/0194348 A1* | 8/2010 | Wang | H01M 10/42 320/136 |
| 2010/0237828 A1* | 9/2010 | Maegawa | H02J 7/0018 320/118 |
| 2011/0084663 A1* | 4/2011 | Troxel | H02J 7/0013 320/118 |
| 2011/0084667 A1 | 4/2011 | Li | |
| 2011/0205678 A1* | 8/2011 | Baba | G06F 1/3212 361/86 |
| 2016/0023563 A1* | 1/2016 | Wang | H02J 7/007 320/152 |
| 2016/0231382 A1* | 8/2016 | Hirose | H02H 3/087 |
| 2017/0101029 A1* | 4/2017 | Kawano | B60L 53/14 |
| 2017/0244239 A1* | 8/2017 | Jin | H02J 7/0031 |
| 2018/0123491 A1 | 5/2018 | Jo et al. | |

FOREIGN PATENT DOCUMENTS

| | | |
|---|---|---|
| CN | 106206185 A | 12/2016 |
| CN | 206452129 U | 8/2017 |
| CN | 108110868 A | 6/2018 |
| WO | 2014141809 A1 | 9/2014 |

OTHER PUBLICATIONS

The First Office Action and Search Report for Chinese Application No. 201811493731.9, dated Aug. 4, 2020, 15 pages.

The International Search Report for PCT Application No. PCT/CN2019/123707, dated Feb. 28, 2020, 10 pages.

* cited by examiner

CHARGE AND DISCHARGE CIRCUIT

CROSS-REFERENCE TO RELATED APPLICATION

This application is a National Stage of International Application No. PCT/CN2019/123707, filed on Dec. 6, 2019, which claims priority to Chinese Patent Application No. 201811493731.9, filed on Dec. 7, 2018, both of which are hereby incorporated by reference in their entireties.

TECHNICAL FIELD

The present application relates to field of battery power, and particularly to a charge and discharge circuit.

BACKGROUND

With rapid development of new energy, new energy may provide power for more and more devices. For example, a battery module, a battery pack and the like may be used as a power source to provide power for new energy vehicles, new energy ships, new energy airplanes, etc. The battery module, battery pack and the like may be charged and discharged for many times during use.

At present, a relay is disposed in the charge and discharge circuit. The charging and discharging of the battery module, the battery pack or the like in the charge and discharge circuit is controlled by controlling on and off of the relay. However, due to low switching speed and high failure rate of the relay, it adversely affects the charging and discharging of the battery module, the battery pack or the like, and reduces the charging and discharging capability of the charge and discharge circuit.

SUMMARY

Embodiments of the present application provide a charge and discharge circuit.

An embodiment of the present application provides a charge and discharge circuit, comprising a charge circuit including a battery pack, a first switch set and a charging device connected in series, wherein the charge circuit is configured to charge the battery pack using the charging device, and pre-charge the charging device; and a discharge circuit including the battery pack, a second switch set and an electrical device connected in series, wherein the discharge circuit is configured to discharge the battery pack to the electrical device and pre-charge the electrical device; wherein both the first switch set and the second switch set include at least one switch, and all switches in the first and second switch sets are semiconductor switches.

An embodiment of the present application provides a charge and discharge circuit, comprising a battery pack, a charging device, an electrical device, a first switch set and a second switch set, wherein the battery pack, the first switch set and the charging device constitute a charge circuit, and the battery pack, the second switch set and the electrical device constitute a discharge circuit. All switches in the charge circuit and the discharge circuit are semiconductor switches.

BRIEF DESCRIPTION OF THE DRAWINGS

The present application may be better understood from the following description of the Detailed Description of the present application with reference to the attached drawings, where the same or similar reference numbers represent the same or similar features.

DETAILED DESCRIPTION

Figure 1:
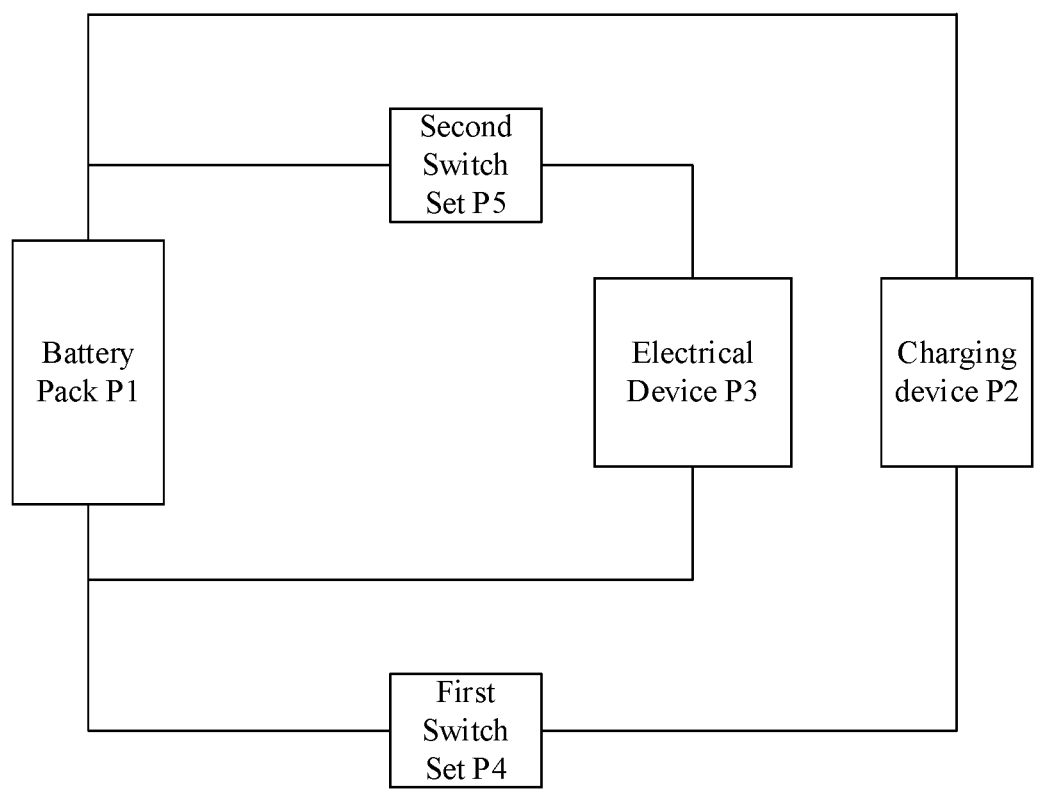
FIG. 1 is a schematic structural diagram of a charge and discharge circuit according to an embodiment of the present application.

Various aspects of features and exemplary embodiments of the present application will be described in detail below. A number of specific details are presented in the following detailed description to provide a comprehensive understanding of the present application. However, it will be apparent to those skilled in the art that the present application may be practiced without some of these specific details. The following description of the embodiments is merely to provide a better understanding of the present application by illustrating examples thereof. The present application is by no means limited to any specific configuration and algorithm set forth below, but covers any modification, replacement and improvement of elements, components and algorithms without departing from the spirit of the present application. Well-known structures and techniques are not shown in the drawings and the following description, so as to avoid unnecessary ambiguity of the present application.

The embodiments of the present application provide a charge and discharge circuit, which may be applied to a scenario in which a battery pack is charged and discharged. The battery pack includes at least one battery module or at least one battery unit, which is not limited herein. The battery pack may be applied to an electric vehicle to supply power for the electric motor as a power source of the electric vehicle. The battery pack may also supply power for other electrical devices in the electric vehicle, such as an in-car air conditioner, a vehicle player, etc.

FIG. 1 is a schematic structural diagram of a charge and discharge circuit according to an embodiment of the present application. As shown in FIG. 1, the charge and discharge circuit includes a charge circuit and a discharge circuit. A battery pack P1 is charged by the charge circuit and discharged by the discharge circuit. Furthermore, the charge circuit in the embodiment of the present application may also be used to pre-charge a charging device, and the discharge circuit may be used to pre-charge an electrical device.

The charge circuit includes a battery pack P1, a first switch set P4 and a charging device P2 connected in series. The first switch set P4 includes at least one switch. The distribution of the switches in the first switch set P4 is not limited. For example, if the first switch set P4 includes a plurality of switches, a part of the switches may be distributed between a positive electrode of the battery pack P1 and the charging device P2, and the other part of switches may be distributed between a negative electrode of the battery pack P1 and the charging device P2. The charging device P2 is a device for charging the battery pack P1. When the battery pack P1 is charged, the charge circuit is turned on.

The discharge circuit includes the battery pack P1, a second switch set P5 and an electrical device P3 connected in series. The second switch set P5 includes at least one switch. The distribution of the switches in the second switch set P5 is not limited. For example, if the second switch set P5 includes a plurality of switches, a part of the switches may be distributed between the positive electrode of the battery pack P1 and the electrical device P3, and the other part of switches may be distributed between the negative electrode of the battery pack P1 and the electrical device P3. The electrical device P3 is a device that consumes the power discharged from the battery pack P1. When the battery module discharges the electrical device P3, the discharge circuit is turned on.

It is worth mentioning that the first switch set P4 and the second switch set P5 may share one or more switches, which is not limited here. The specific content will be described in the following specific implementation.

It should be noted that all switches in the first switch set P4 and the second switch set P5 are semiconductor switches. In some examples, the semiconductor switches may include a metal-oxide-semiconductor field-effect transistor (Metal-Oxide-Semiconductor Field-Effect Transistor, MOSFET) or an insulated gate bipolar transistor (Insulated Gate Bipolar Transistor, IGBT). Both MOSFET and IGBT may be cut off with load.

It should be noted that the MOSFET has a gate, a source and a drain. There is a parasitic diode between the source and the drain of the MOSEFT, that is, there is a diode whose turn-on direction is from source to drain. The diode may be provided in the IGBT, whose turn-on direction is from source to drain. The diode may not be provided in the IGBT either, which is not limited herein.

In some examples, if the MOSFET is used to perform a relay function, two MOSFETs with sources connected in series or two IGBTs with sources connected in series are required. That is to say, the first switch set P4 and/or the second switch set P5 at least includes two MOSFETs with sources connected in series or two IGBTs with sources connected in series. The two MOSFETs with sources connected in series or the two IGBTs with sources connected in series may be directly connected in series or indirectly connected in series, that is, the sources of the two MOSFETs or those of the two IGBTs may be connected in series by one or more devices, which is not limited herein.

In some examples, the charge and discharge circuit further includes a controller which may be connected to various switches in the charge circuit and the discharge circuit. The controller may send a control signal to each switch in the charge circuit and the discharge circuit, so as to control turn-on or turn-off of each switch in the charge circuit and the discharge circuit. The control signal may include a turn-on signal, a turn-off signal, a pulse signal, etc., which is not limited herein. The pulse signal may specifically be a pulse width modulation (Pulse Width Modulation, PWM) signal.

For example, the controller sends a turn-on signal to a part of switches in the first switch set P4 and sends a pulse signal to the other part of switches in the first switch set P4 to control the part of switches in the first switch set P4 to be turned on and the other part switches to be turned on at intervals, so as to pre-charge the charging device P2.

The controller may be configured to send a turn-on signal to the switches in the first switch set P4 to control the switches in the first switch set P4 to be turned on and realize the turn-on of the charge circuit, so as to allow the charging device P2 to charge the battery pack P1.

The controller sends a turn-on signal to a part of switches in the second switch set P5 and sends a pulse signal to the other part of switches in the second switch set P5 to control the part of switches in the second switch set P5 to be turned on and the other part switches to be turned on at intervals, so as to pre-charge the electrical device P3.

The controller sends a turn-on signal to the switches in the second switch set P5 to control the switches in the second switch set P5 to be turned on and realize the turn-on of the discharge circuit, so as to allow the battery pack P1 to discharge to the electrical device P3.

It should be noted that other parts of the charging and discharging circuit other than the charging device P2 in the embodiment of the present application may be provided in an electric device or an electric system. For example, other parts of the charge and discharge circuit other than the charging device P2 may be provided in an electric vehicle, and the electrical device P3 is an electrical portion in the electric vehicle. The charging device P2 may specifically be a charging pile, a commercial power charging interface, or the like, which is not limited herein. The charging device P2 will only be connected to the charging circuit during the charging process. For example, the electric vehicle will be charged, and the electric vehicle will be connected to the charging pile. The charging device P2 itself may also be provided with a charging switch. When the charging device P2 is connected to the charging circuit and the charging switch is turned on, the charging device may then be conducted with other parts of the charge circuit.

In the embodiments of the present application, the charge and discharge circuit includes a battery pack P1, a charging device P2, an electrical device P3, a first switch set P4 and a second switch set P5. The battery pack P1, the first switch set P4 and the charging device P2 constitute a charge circuit, and the battery pack P1, the second switch set P5 and the electrical device P3 constitute a discharge circuit. All switches in the charge circuit and the discharge circuit are semiconductor switches. The semiconductor switches have smaller volume and weight, low failure rate and high switching speed, which can reduce adverse effect on the charging and discharging of the battery module, the battery pack and the like, and can improve the charging and discharging capability of the charge and discharge circuit. While the charging and discharging circuit is controlled safely, the switching devices in the charging and discharging circuit is prevented from being damaged. Furthermore, the overall volume and weight of the charge and discharge circuit using the semiconductor switch will also be reduced, and the probability of charging and discharging failure of the charge and discharge circuit is also decreased accordingly. The switching rate of the charge and discharge circuit according to the embodiments of the present application is increased, and the controllability of the charging and discharging of the charge and discharge circuit is improved.

Specific implementations of several charge and discharge circuits will be introduced in detail below. For ease of introduction, a semiconductor switch will be taken as an example, the semiconductor switch is a MOSFET, a first end of the MOSFET is a drain, a second end is a source, and a control end of the MOSFET is a gate. The diode between the drain and the source of the MOSFET is a parasitic diode.

Figure 2:
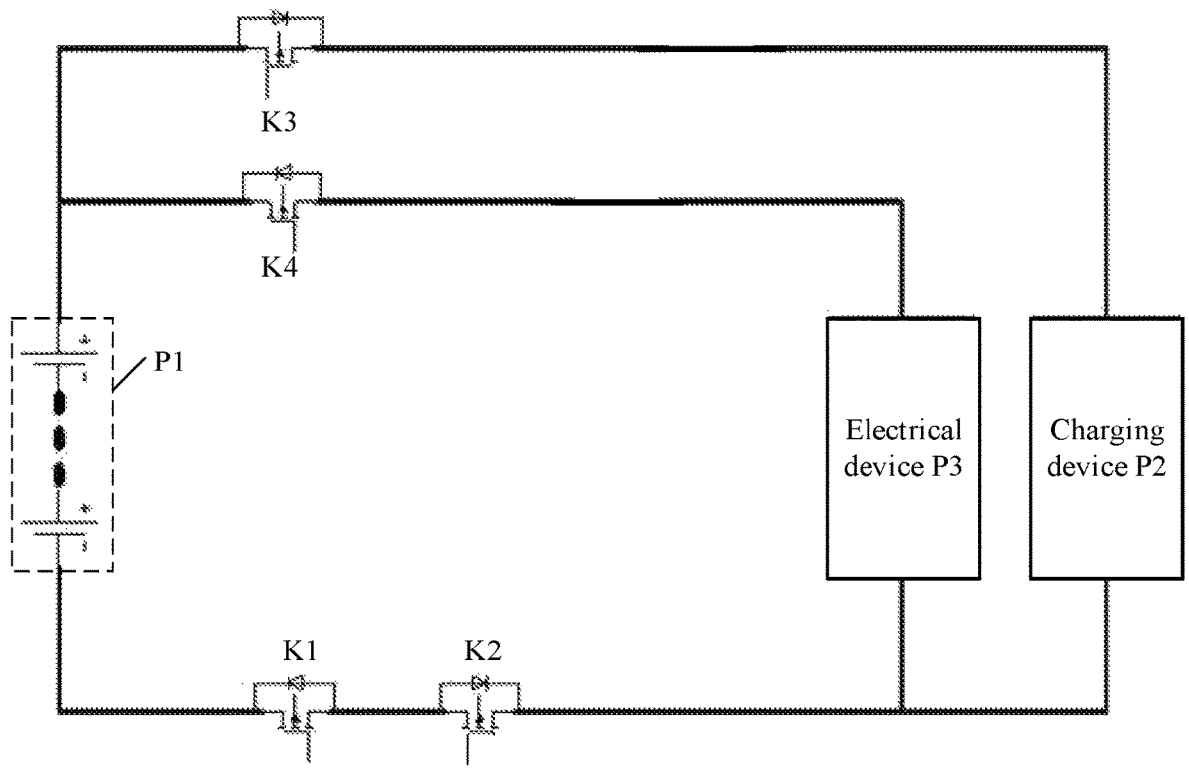
FIG. 2 is a schematic structural diagram of a specific implementation of a charge and discharge circuit according to an embodiment of the present application.

FIG. 2 is a schematic structural diagram of a specific implementation of a charge and discharge circuit according to an embodiment of the present application. As shown in FIG. 2, the first switch set P4 includes a first switch K1, a second switch K2 and a third switch K3. The second switch set P5 includes the first switch K1, the second switch K2 and a fourth switch K4.

A first end of the first switch K1 is connected to a negative electrode of the battery pack P1. A second end of the first switch K1 is connected to a second end of the second switch K2. A first end of the second switch K2 is connected to one end of the charging device P2. The other end of the charging device P2 is connected to a first end of the third switch K3, and a second end of the third switch K3 is connected to a positive electrode of the battery pack P1.

The first end of the second switch K2 is connected to one end of the electrical device P3. The other end of the electrical device P3 is connected to a second end of the fourth switch K4. A first end of the fourth switch K4 is connected to the positive electrode of the battery pack P1.

The first switch K1, the second switch K2, the third switch K3 and the fourth switch K4 are all semiconductor switches.

In some examples, positions of the first switch K1 and the second switch K2 in FIG. 2 may be exchanged, that is, the negative electrode of the battery pack P1 is connected to the second end of the second switch K2, the first end of the second switch K2 is connected to the first end of the first switch K1, and the second end of the first switch K1 is connected to one end of the charging device P2 and one end of the electrical device P3.

As can be seen from FIG. 2, the charge circuit includes three semiconductor switches connected in series, and the discharge circuit includes three semiconductor switches connected in series. The charge circuit and the discharge circuit share the first switch K1 and the second switch K2. The second end (i.e. a source) of the first switch K1 is connected to the second end (i.e. a source) of the second switch K2. It is ensured that the parasitic diodes of the first switch K1 and the second switch K2 will not turned on at the same time, thereby ensuring the realization of the switching function and avoiding the wrong turn-on of the charge circuit and the discharge circuit.

The charge and discharge circuit may realize four processes of pre-charging of charging, charging, pre-charging of discharging and discharging of the battery pack P1.

The controller may send control signals to the first switch K1, the second switch K2, the third switch K3 and the fourth switch K4. Specifically, the controller can send control signals to the control ends of the first switch K1, the second switch K2, the third switch K3 and the fourth switch K4, so as to realize the turn-on and turn-off of the first switch K1, the second switch K2, the third switch K3 and the fourth switch K4.

During the pre-charging process of charging, the first switch K1 and the third switch K3 are turned on, the fourth switch K4 is turned off, and the second switch K2 is turned on at intervals, so as to realize the interval turn-on of the charge circuit to pre-charge the charging device P2.

Specifically, the controller may send a turn-on signal to the first switch K1 and the third switch K3 to control both the first switch K1 and the third switch K3 to be turned on. The controller sends a turn-off signal to the fourth switch K4 to control the fourth switch K4 to be turned off. The controller sends a pulse signal to the second switch K2 to control the second switch K2 to be turned on at intervals, so as to pre-charge the charging device P2.

During the charging process, the first switch K1, the second switch K2 and the third switch K3 are turned on, and the fourth switch K4 is turned off.

Specifically, the controller may send a turn-on signal to the first switch K1 and the third switch K3 to control the first switch K1 and the third switch K3 to be turned on. The controller sends a turn-off signal to the fourth switch K4 to control the fourth switch K4 to be turned off, so as to allow the charging device P2 to charge the battery pack P1.

It should be noted that the turn-on direction of the parasitic diode in the second switch K2 is from the second end to the first end. Therefore, whether the second switch K2 is turned on or turned off, the parasitic diode in the second switch K2 is turned on. A turn-on instruction may be sent to the second switch K2. The charging process may be triggered by the turn-on control of the first switch K1 and the third switch K3.

In the pre-charging process of discharging, the first switch K1 and the fourth switch K4 are turned on, the third switch K3 is turned off, and the second switch K2 is turned on at intervals.

Specifically, the controller sends a turn-on signal to the first switch K1 and the fourth switch K4 to control the first switch K1 and the fourth switch K4 to be turned on. The controller sends a turn-off signal to the third switch K3 to control the third switch K3 to be turned off. The controller sends a pulse signal to the second switch K2 to control the second switch K2 to be turned on at intervals, so as to pre-charge the electrical device P3.

During the discharging process, the first switch K1, the second switch K2 and the fourth switch K4 are turned on, and the third switch K3 is tuned off.

Specifically, the controller may send a turn-on signal to the first switch K1, the second switch K2 and the fourth switch K4 to control the first switch K1, the second switch K2 and the fourth switch K4 to be turned on. The controller sends a turn-off signal to the third switch K3 to control the third switch K3 to be turned off, so as to allow the battery pack P1 to discharge to the electrical device P3.

Figure 3:
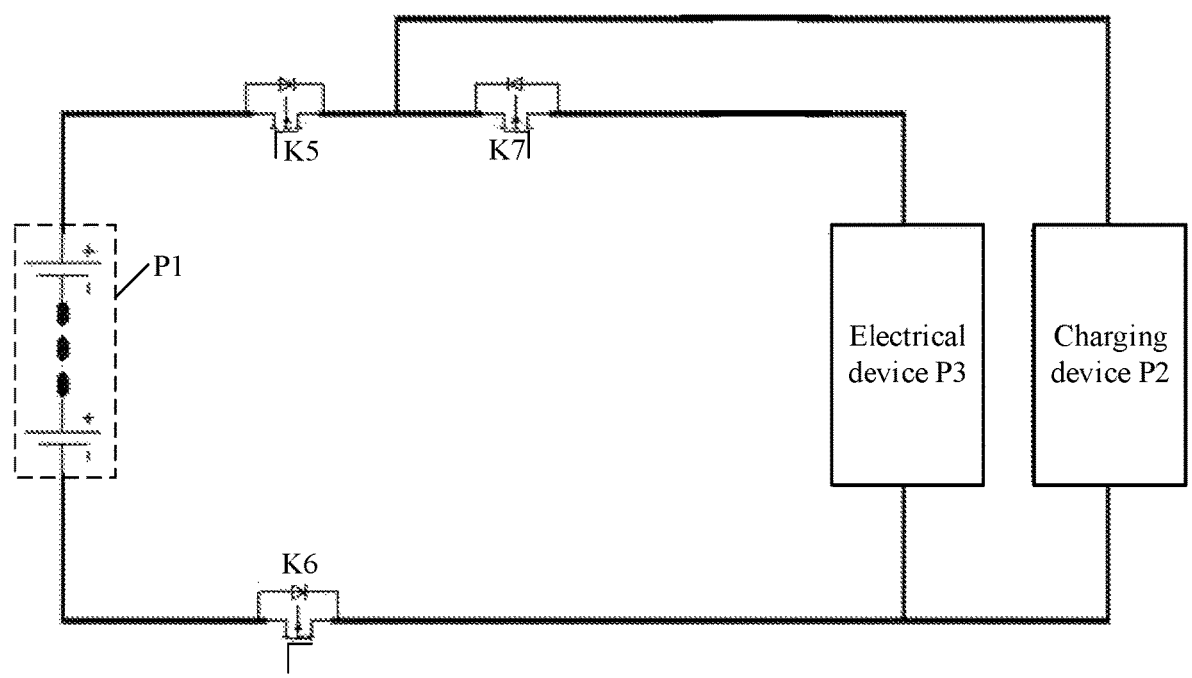
FIG. 3 is a schematic structural diagram of another specific implementation of a charge and discharge circuit according to an embodiment of the present application.

FIG. 3 is a schematic structural diagram of another specific implementation of a charge and discharge circuit according to an embodiment of the present application. As shown in FIG. 3, the first switch set P4 includes a fifth switch K5 and a sixth switch K6. The second switch set P5 includes the fifth switch K5, the sixth switch K6 and a seventh switch K7.

A second end of the fifth switch K5 is connected to a positive electrode of the battery pack P1. A first end of the fifth switch K5 is connected to one end of the charging device P2. The other end of the charging device P2 is connected to a first end of the sixth switch K6. A second end of the sixth switch K6 is connected to a negative electrode of the battery pack P1.

The first end of the fifth switch K5 is connected to a first end of the seventh switch K7. A second end of the seventh switch K7 is connected to one end of the electrical device P3. The other end of the electrical device P3 is connected to the first end of the sixth switch K6.

The fifth switch K5, the sixth switch K6 and the seventh switch K7 are all semiconductor switches.

As can be seen from FIG. 3, the charge circuit includes two semiconductor switches connected in series, and the discharge circuit includes three semiconductor switches connected in series. The charge circuit and the discharge circuit share the fifth switch K5 and the sixth switch K6. There are a total of three semiconductor switches in the charge and discharge circuit. As compared with FIG. 2, a smaller number of semiconductor switches are used, which reduces the total on-resistance of the semiconductor switches in the charge and discharge circuit, thereby reducing the total on-power consumption of the semiconductor switches in the charge and discharge circuit.

The controller may send control signals to the fifth switch K5, the sixth switch K6 and the seventh switch K7. Specifically, the controller may send control signals to the control ends of the fifth switch K5, the sixth switch K6 and the seventh switch K7 to realize the turn-on and turn-off of the fifth switch K5, the sixth switch K6 and the seventh switch K7.

During the pre-charging process of charging, the fifth switch K5 is turned on, the seventh switch K7 is turned off, and the sixth switch K6 is turned on at intervals, so as to realize the interval turn-on of the charge circuit to pre-charge the charging device P2.

Specifically, the controller sends a turn-on signal to the fifth switch K5 to control the fifth switch K5 to be turned on. The controller sends a turn-off signal to the seventh switch K7 to control the seventh switch K7 to be turned off. The controller sends a pulse signal to the sixth switch K6 to control the sixth switch K6 to be turned on at intervals, so as to pre-charge the charging device P2.

During the charging process, the fifth switch K5 and the sixth switch K6 are turned on, and the seventh switch K7 is tuned off.

Specifically, the controller sends a turn-on signal to the fifth switch K5 and the sixth switch K6 to control the fifth switch K5 and the sixth switch K6 to be turned on. The controller sends a turn-off signal to the seventh switch K7 to control the seventh switch K7 to be turned off, so as to allow the charging device P2 to charge the battery pack P1.

It should be noted that the charging process is triggered by the turning on the fifth switch K5.

During the pre-charging process of discharging, the fifth switch K5 and the seventh switch K7 are turned on, and the sixth switch K6 is turned on at intervals.

Specifically, the controller sends a turn-on signal to the fifth switch K5 and the seventh switch K7 to control the fifth switch K5 and the seventh switch K7 to be turned on. The controller sends a pulse signal to the sixth switch K6 to control the sixth switch K6 to be turned on at intervals, so as to pre-charge the electrical device P3.

During the discharging process, the sixth switch K6 and the seventh switch K7 are turned on, and the fifth switch K5 is turned off.

Specifically, the controller sends a turn-on signal the fifth switch K5, the sixth switch K6 and the seventh switch K7 to control the fifth switch K5, the sixth switch K6 and the seventh switch K7 to be turned on, so as to allow the battery pack P1 to discharge to the electrical device P3.

Figure 4:
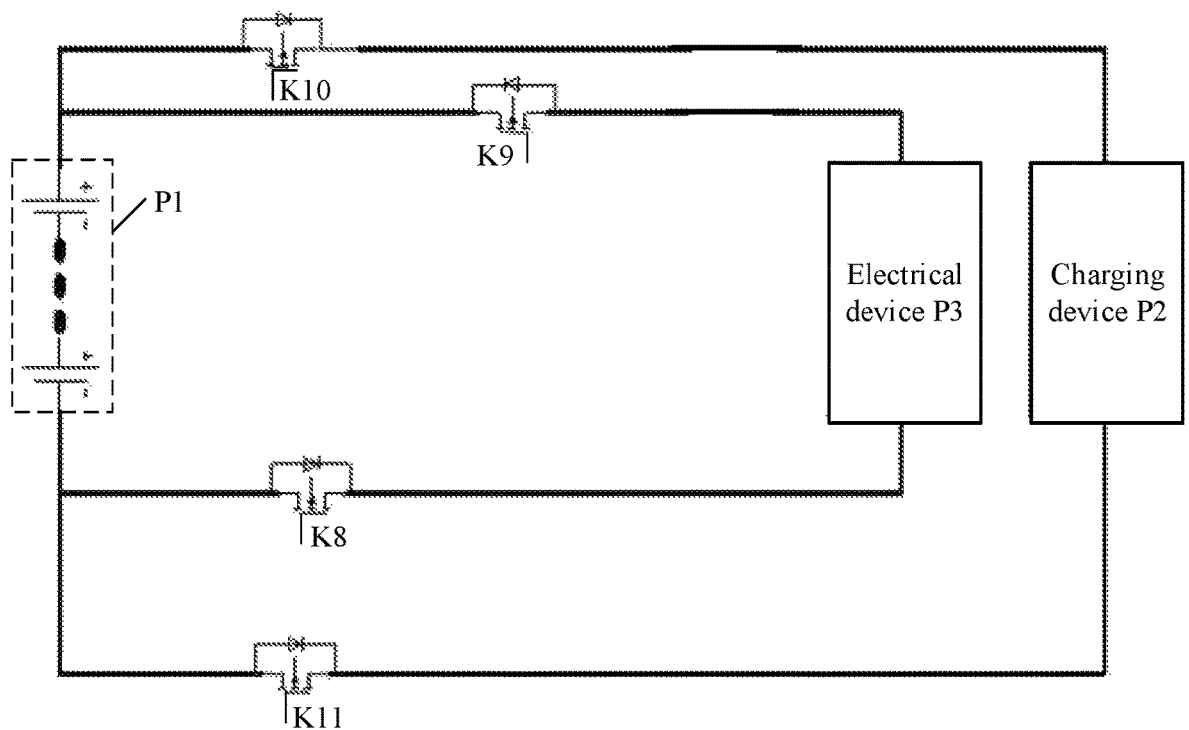
FIG. 4 is a schematic structural diagram of yet another specific implementation of a charge and discharge circuit according to an embodiment of the present application.

FIG. 4 is a schematic structural diagram of yet another specific implementation of a charge and discharge circuit according to an embodiment of the present application. As shown in FIG. 4, the second switch set P5 includes an eighth switch K8 and a ninth switch K9. The first switch set P4 includes a tenth switch K10 and an eleventh switch K11.

A second end of the eighth switch K8 is connected to the negative electrode of the battery pack P1, a first end of the eighth switch K8 is connected to one end of the electrical device P3, the other end of the electrical device P3 is connected to a second end of the ninth switch K9, and a first end of the ninth switch K9 is connected to the positive electrode of the battery pack P1.

A second end of the tenth switch K10 is connected to the positive electrode of the battery pack P1, a first end of the tenth switch K10 is connected to the other end of the charging device P2, a second end of the eleventh switch K11 is connected to the negative electrode of the battery pack P1, and a first end of the eleventh switch K11 is connected to the one end of the charging device P2.

The eighth switch K8, the ninth switch K9, the tenth switch K10 and the eleventh switch K11 are all semiconductor switches.

As shown in FIG. 4, the charge circuit includes two semiconductor switches connected in series, and the discharge circuit includes two semiconductor switches connected in series.

The controller may send control signals to the eighth switch K8, the ninth switch K9, the tenth switch K10 and the eleventh switch K11. Specifically, the controller may send control signals to control ends of the eighth switch K8, the ninth switch K9, the tenth switch K10 and the eleventh switch K11 to realize the turn-on and turn-off of the eighth switch K8, the ninth switch K9, the tenth switch K10 and the eleventh switch K11.

During the pre-charging process of charging, the tenth switch K10 is turned on, the eleventh switch K11 is turned on at intervals, and the eighth switch K8 and the ninth switch K9 are turned off.

Specifically, the controller sends a turn-on signal to the tenth switch K10 to control the tenth switch K10 to be turned on. The controller sends a turn-off signal to the eighth switch K8 and the ninth switch K9 to control the eighth switch K8 and the ninth switch K9 to be turned off. The controller sends a pulse signal to the eleventh switch K11 to control the eleventh switch K11 to be turned on at intervals, so as to pre-charge the charging device P2.

During the charging process, the tenth switch K10 and the eleventh switch K11 are turned, and the eighth switch K8 and the ninth switch K9 are turned off.

Specifically, the controller sends a turn-on signal to the tenth switch K10 and the eleventh switch K11 to control the tenth switch K10 and the eleventh switch K11 to be turned on. The controller sends a turn-off signal to the eighth switch K8 and the ninth switch K9 to control the eighth switch K8 and the ninth switch K9 to be turned off, so as to allow the charging device P2 to charge the battery pack P1.

During the pre-charging process of discharging, the ninth switch K9 is turned on, the tenth switch K10 and the eleventh switch K11 are turned off, and the eighth switch K8 is turned on at intervals.

Specifically, the controller sends a turn-on signal to the ninth switch K9 to control the ninth switch K9 to be turned on. The controller sends a turn-off signal to the tenth switch K10 and the eleventh switch K11 to control the tenth switch K10 and the eleventh switch K11 to be turned off. The controller sends a pulse signal to the eighth switch K8 to control the eighth switch K8 to be turned on at intervals, so as to pre-charge the electrical device P3.

During the discharging process, the eighth switch K8 and the ninth switch K9 are turned on, and the tenth switch K10 and the eleventh switch K11 are turned off.

Specifically, the controller sends a turn-on signal to the eighth switch K8 and the ninth switch K9 to control the eighth switch K8 and the ninth switch K9 to be turned on. The controller sends a turn-off signal to the tenth switch K10 and the eleventh switch K11 to control the tenth switch K10 and the eleventh switch K11 to be turned off, so as to allow the battery pack P1 to discharge to the electrical device P3.

It should be noted that in the foregoing embodiments, pre-charging the charging device specifically refers to pre-charging a capacitor in the charging device. Pre-charging the electrical device specifically refers to pre-charging the capacitor in the electrical device.

It should be clear that the various embodiments in the present specification are described in a progressive manner such that same or similar parts among embodiments may be referred to each other and each embodiment is described by focusing on the differences from other embodiments. The present application is not limited to the specific structures described above and illustrated in the drawings. A person skilled in the art may make various changes, modifications and additions after understanding the spirit of the present application.

Those skilled in the art shall appreciate that the foregoing embodiments are illustrative but not limiting. Different technical features appearing in different embodiments may be combined to achieve advantages. Those skilled in the art shall appreciate and implement other variant embodiments of the disclosed embodiments upon reviewing the drawings, the specification and the claims. In the claims, the term "comprising" will not preclude another device(s) or step(s); the indefinite article "a/an" will not preclude plural; and the terms "first", "second", etc., are intended to designate a name but not to represent any specific order. Any reference number in the claims shall not be construed as limiting the scope of protection. Functions of a plurality of parts appearing in a claim may be performed by a separate hardware or software unit. Some technical features appearing in different dependent claims will not mean that these technical features cannot be combined to achieve advantages.

What is claimed is:

1. A charge and discharge circuit, comprising:
    a charge circuit comprising a battery pack, a first switch set and a charging device connected in series, wherein the charge circuit is configured to charge the battery pack by using the charging device and pre-charge the charging device; and
    a discharge circuit comprising the battery pack, a second switch set and an electrical device connected in series, wherein the discharge circuit is configured to allow the battery pack to discharge to the electrical device and pre-charge the electrical device;
    wherein both the first switch set and the second switch set include at least one switch, and all switches in the first switch set and the second switch set are semiconductor switches;
    wherein the second switch set comprises an eighth switch and a ninth switch, the first switch set comprises a tenth switch and an eleventh switch, a first end of the eighth switch is connected to one end of the electrical device, and a first end of the tenth switch is connected to one end of the charging device,
    a second end of the eighth switch is connected to a negative electrode of the battery pack, the other end of the electrical device is connected to a second end of the ninth switch, and a first end of the ninth switch is connected to a positive electrode of the battery pack;
    a second end of the tenth switch is connected to the positive electrode of the battery pack, a second end of the eleventh switch is connected to the negative electrode of the battery pack, and a first end of the eleventh switch is connected to the other end of the charging device; and
    the charge and discharge circuit further comprises a controller, and the controller is configured to:
    send a turn-on signal to the tenth switch to control the tenth switch to be turned on, send a turn-off signal to the eighth switch and the ninth switch to control the eighth switch and the ninth switch to be turned off, and send a pulse signal to the eleventh switch to control the eleventh switch to be turned on at intervals, so as to pre-charge the charging device;
    send a turn-on signal to the tenth switch and the eleventh switch to control the tenth switch and the eleventh switch to be turned on, and send a turn-off signal to the eighth switch and the ninth switch to control the eighth switch and the ninth switch to be turned off, so as to allow the charging device to charge the battery pack;
    send a turn-on signal to the ninth switch to control the ninth switch to be turned on, sending a turn-off signal to the tenth switch and the eleventh switch to control the tenth switch and the eleventh switch to be turned off, and send a pulse signal to the eighth switch to control the eighth switch to be turned on at intervals, so as to pre-charge the electrical device; and
    send a turn-on signal to the eighth switch and the ninth switch to control the eighth switch and the ninth switch to be turned on, and send turn-off signal to the tenth switch and the eleventh switch to control the tenth switch and the eleventh switch to be turned off, so as to allow the battery pack to discharge to the electrical device.

2. The charge and discharge circuit of claim 1, wherein the semiconductor switches include a MOSFET or an IGBT.

3. The charge and discharge circuit of claim 2, wherein a first end of the MOSFET or the IGBT is a drain, and a second end of the MOSFET or the IGBT is a source.

* * * * *